(12) United States Patent
Harrison et al.

(10) Patent No.: US 7,472,921 B2
(45) Date of Patent: Jan. 6, 2009

(54) ASSISTIVE MOBILITY DEVICE

(76) Inventors: Richard J. Harrison, 8 Spring Meadow La., Hockessin, DE (US) 19707; William Frederick Mann, III, 19 Healy Pl., Avondale, PA (US) 19311

( * ) Notice: Subject to any disclaimer, the term of this patent is extended or adjusted under 35 U.S.C. 154(b) by 448 days.

(21) Appl. No.: 11/362,573

(22) Filed: Feb. 27, 2006

(65) Prior Publication Data
US 2006/0197314 A1 Sep. 7, 2006

Related U.S. Application Data

(63) Continuation-in-part of application No. 11/221,079, filed on Sep. 8, 2005, and a continuation-in-part of application No. 10/075,862, filed on Feb. 13, 2002, now Pat. No. 7,036,161, and a continuation-in-part of application No. 10/014,125, filed on Dec. 11, 2001, now Pat. No. 6,776,433, and a continuation-in-part of application No. 09/642,948, filed on Aug. 22, 2000, now Pat. No. 6,428,033.

(51) Int. Cl.
*A47C 4/28* (2006.01)
(52) U.S. Cl. .................. 280/647; 280/649; 280/650; 297/16.2
(58) Field of Classification Search ............... 280/644, 280/647, 649, 650, 87.05; 297/16.1, 16.2, 297/3, 94
See application file for complete search history.

(56) References Cited

U.S. PATENT DOCUMENTS

| | | | |
|---|---|---|---|
| 4,045,051 A * | 8/1977 | Igarashi et al. .............. 280/644 |
| 4,140,341 A * | 2/1979 | Rabe ............................ 297/45 |
| 4,258,951 A * | 3/1981 | Groom ....................... 297/16.2 |
| 5,076,390 A * | 12/1991 | Haskins ................... 280/250.1 |
| 5,290,050 A | 3/1994 | Kim |
| 5,560,636 A * | 10/1996 | Chen .......................... 280/642 |
| 5,568,933 A | 10/1996 | Mizuno |
| 5,984,406 A * | 11/1999 | Lee ........................... 297/16.2 |
| 6,082,813 A * | 7/2000 | Chen ......................... 297/16.2 |
| 6,113,181 A | 9/2000 | Tang |
| 6,149,238 A * | 11/2000 | Tsai ...................... 297/411.43 |
| 6,155,579 A | 12/2000 | Eyman et al. |
| 6,209,951 B1 * | 4/2001 | Han ............................ 297/45 |
| 6,231,119 B1 | 5/2001 | Zheng |
| 6,247,748 B1 * | 6/2001 | Zheng ....................... 297/16.2 |
| 6,247,749 B1 * | 6/2001 | Yu ............................ 297/16.2 |
| 6,264,271 B1 * | 7/2001 | Munn et al. ................... 297/45 |
| 6,354,619 B1 | 3/2002 | Kim |
| 6,715,824 B2 * | 4/2004 | Zheng ....................... 297/16.2 |
| 6,736,450 B2 * | 5/2004 | Miyagi ..................... 297/16.2 |
| 6,776,433 B2 | 8/2004 | Harrison et al. |

(Continued)

*Primary Examiner*—Christopher Ellis
*Assistant Examiner*—Jacob Meyer

(57) ABSTRACT

The present invention is a collapsible self-propelled chair on wheels that is lightweight in construction and easily collapsed, carried, stored and transported by public or private means. The chair performs the function of a wheelchair while avoiding the appearance of a traditional wheelchair thus avoiding the invalid stigma often associated with wheelchairs. It can be configured as an assistive mobility device to fill the unmet needs of aging healthy adults who wish to retain their independence and social interactions or a medical device to assist those with medical needs. Additional features such as an armrest, a footrest, or a reclining back are easily added during manufacture and because of the chairs uncomplicated design and duplicity of parts, it is very economical to manufacture.

20 Claims, 12 Drawing Sheets

U.S. PATENT DOCUMENTS

| | | | |
|---|---|---|---|
| 6,938,911 B1* | 9/2005 | Shyu et al. | 280/250.1 |
| 7,077,422 B2* | 7/2006 | Haury et al. | 280/647 |
| 7,229,131 B2* | 6/2007 | Chen | 297/217.4 |
| 7,258,361 B2* | 8/2007 | Haury et al. | 280/649 |
| 2007/0102901 A1* | 5/2007 | Murayama | 280/642 |
| 2007/0145723 A1* | 6/2007 | Kamara | 280/647 |
| 2007/0252416 A1* | 11/2007 | Park et al. | 297/16.2 |
| 2008/0042473 A1* | 2/2008 | Dickie et al. | 297/16.1 |
| 2008/0042474 A1* | 2/2008 | Dickie et al. | 297/16.2 |

* cited by examiner

ASSISTIVE MOBILITY DEVICE

CROSS REFERENCE TO RELATED APPLICATION

This application is a forth Continuation-in-Part of parent U.S. patent application Ser. No. 09/642,948 filed on Aug. 22, 2000—now U.S. Pat. No. 6,428,033, and a first Continuation-in-Part U.S. patent application Ser. No. 10/014,125 filed on Dec. 11, 2001—now U.S. Pat. No. 6,776,433 and a second Continuation-in-Part U.S. patent application Ser. No. 10/075,862 filed Feb. 13, 2002 and a third Continuation-in-Part U.S. patent application Ser. No. 11/221,079 filed Sep. 8, 2005.

FIELD OF THE INVENTION

The present invention is a portable self-propelled wheelchair that is extremely lightweight in construction and easily collapsed, carried, stored and transported by public or private means. The wheelchair can be used as an assistive mobility device to meet the needs of those who are physically impaired. Moreover, the present invention is economical to manufacture due to its simplicity of materials, uncomplicated design and duplication of parts.

BACKGROUND OF THE INVENTION

Wheelchairs are a type of assistive mobility device. Traditionally, wheelchairs have been designed to facilitate patient transport for the medically infirmed. In meeting the needs of medical patients, the wheelchair has evolved into a classic styling that is easily recognized and most often associated with medically disabled or invalid patients. This easy recognition has created a stigma for those who use a wheelchair. Because of this stigma, many aging adults that would benefit from using a wheelchair limit their activities and social interactions rather than being branded as an invalid. The basic concept of the invention is to provide mobility in a way that does not stereotype the user as being disabled or invalid.

Americans are living longer with life expectancy increasing annually according to the federal Center for Disease Control and Prevention. In addition, Americans 65 years and older represent the segment of U.S. population that is the fastest growing according to the U.S. Bureau of the Census. The impact this older adult segment will have on our healthcare system is inevitable in the future. So is the need and desire to extend the independence of older Americans.

Significant research has been conducted on older persons on the impact of reduced activities and social interactions on their wellness. These include studies by individual researchers and large scale studies such as the National Survey of Self Care and Aging, National Health Interview Survey, National Long-term Care Survey, and the Canadian Health and Activity Limitation Survey. The results of these studies provide conclusive proof that wellness and the quality of life of healthy older Americans is improved by extending their independence and social interactions.

Portable wheelchairs, a type of assistive mobility device, capable of folding or collapsing have been in use for many years to accommodate wheelchair users who travel and need to take their wheelchairs with them. Typically, the wheelchairs that are designed to fold or collapse incorporate a pair of diagonally extending cross members secured between a right and left frame member which may be scissored together to collapse the wheelchair. Standard cross member frame construction for portable wheelchairs is bulky and heavy, making transport or storage difficult at best. Other folding wheelchair designs such as those which fold around a center pole or those which fold with the backrest collapsing forward have the same problems.

Therefore, a need exists within the older adults community for those who are not necessarily invalids to have an assistive mobility device that provides the means for easy participation in activities and social interactions without the wheelchair stigma. In U.S. Pat. No. 6,776,433 we first disclosed our companion wheelchair invention. Its unique design provides mobility without the appearance of a traditional wheelchair. The chair described in U.S. Pat. No. 6,776,433 is of a type classified by Medicare as an E1038 and requires a person to push the wheelchair occupant.

This specification discloses our invention of an ultra lightweight self-propelled wheelchair that will provide mobility and has the potential to extend the independence, quality of life and social interactions of the millions of aging Americans who still have the arm strength to propel themselves while again having a unique non-traditional design. This type of chair is typically classified by Medicare as a K1001 through K1010. Additionally, the present invention provides a solution to the needs for a lightweight, easily collapsible, portable, and storable assistive mobility device.

SUMMARY OF THE INVENTION

Therefore, the object of the present invention is to present a compact, collapsible, assistive mobility device that provides the means for aging adults to participate in activities and social interactions without the wheelchair stigma. The invention accomplishes this by creating a new design appearance for a self-propelled assistive mobility device. The design uses the same frame construction described in our U.S. Pat. No. 6,776,433, and augments or replaces the rear caster wheels with large drive wheels attached to the rear posts. Moreover, the preferred embodiment of the invention replaces the two traditional push handles with a removable push-bar that further strengthens the frame and alters the assistive mobility device's appearance. In addition, the typical wheelchair's two-piece fabric back and seat are replaced by a single piece of fabric in the preferred embodiment of the invention. This further alters the appearance of the assistive mobility device.

It is another object of the present invention to provide a new frame construction design for self-propelled wheelchairs. Whereas, most self-propelled wheelchairs to date have collapsed by bringing the two opposing sides together, and a few have folded front to back or around a center pole. None have had a four-sided frame that simultaneously collapsed inwardly in both the front to back and side to side directions. This creates a significant advantage in the compact size that results when the assistive mobility device is collapsed. An additional embodiment of the invention is the use of removable wheels that provides a method for the chair to be stored in an even smaller space.

It is yet another advantage of the present invention to provide a compact collapsible assistive mobility device that has a significant number of parts which are identical for economical construction. In the preferred embodiment of the invention at least six of the seat support arms, four upper corner brackets, two front caster wheels and associated corner brackets, two back corner brackets and two back rest supports are interchangeable.

It is yet another advantage of the present invention to provide an adjustable footrest which is also collapsible.

It is yet another advantage of the present invention to provide an adjustable backrest.

In a preferred embodiment of the invention, the wheelchair has two removable drive wheels mounted at the back of the chair and two swivel casters wheels mounted on the front of the chair. In addition, a locking and braking mechanism can be provided for the drive to lock the assistive mobility device in a fixed location during the mounting and dismounting of the device.

In yet another embodiment of the invention, the wheelchair has two removable drive wheels mounted at the front, the middle or the back of the chair in addition to the original transporter wheels. This allows an additional self propelled component to the chair so that one can still use the chair in its original transporter configuration when the drive wheels are removed.

It is yet another advantage of the present invention to provide a flexible carrying case for the assistive mobility device.

It is yet another advantage of the present invention to provide a collapsed assistive mobility device which will fit easily into the luggage compartment or storage areas of mass transit vehicles and the back seat or trunk of most automobiles.

These and further objects, features and advantages of the present invention will become apparent from the foregoing detailed description, wherein reference is made to figures and the accompanying drawings.

BRIEF DESCRIPTION OF THE DRAWINGS

FIG. 11A is a detailed view of the push bar cam lock connector.

DETAILED DESCRIPTION OF THE DISCLOSURE

For easy of understanding, in this patent application specification, references numerals to identical features and parts are identical to those appearing in U.S. Pat. No. 6,776,433 and new reference numbers are so designated.

Figure 1:
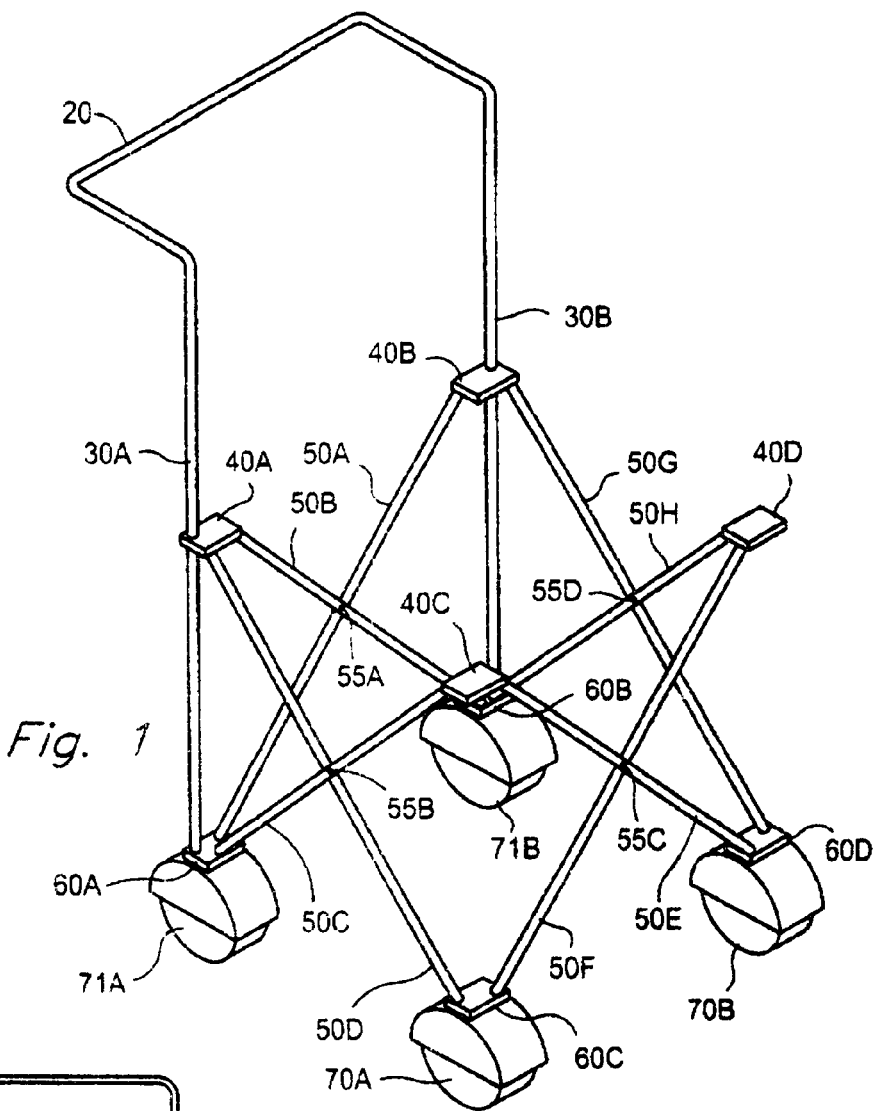
FIG. 1 is a perspective view of the basic assistive mobility device frame with casters 70A, 70B, 71A and 71B attached and without a seat and back means 100 illustrated as illustrated in U.S. Pat. No. 6,776,433.
Figure 2:
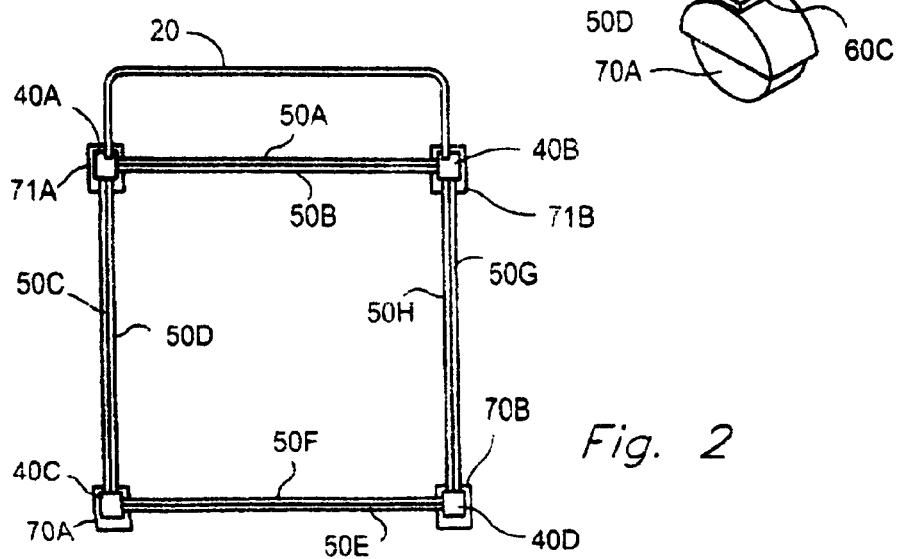
FIG. 2 is a top view of the mobility device frame shown in FIG. 1 with casters 70A, 70B, 71A and 71B attached and without a seat and back means 100.
Figure 3:
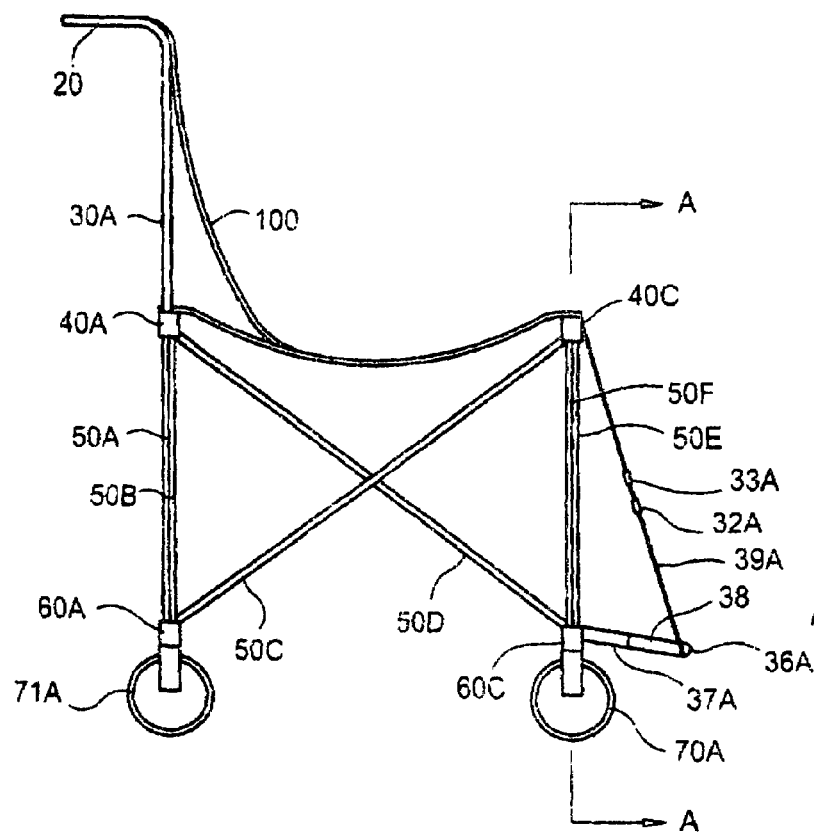
FIG. 3 is a side view of the basic assistive mobility device frame in its normally open position with a seat and back means.

Referring now to the drawings, FIG. 1 and FIG. 2 without a seat and back means illustrate the basic frame structure described in U.S. Pat. No. 6,776,433. The preferred embodiment of the four-sided frame is comprised of two (2) seat support arms 50A and 50B, 50C and 50D, 50E and 50F and 50G and 50H per side, four (4) upper corner brackets 40A, 40B, 40C, and 40D, four (4) lower corner brackets 60A, 60B, 60C and 60D, two (2) vertical back rest posts 30A and 30B, a push bar 20, and four (4) removable casters 70A, 70B, 71A and 71B. FIG. 3 is a side view of a preferred embodiment with a flexible one piece backrest and seat means 100 shown. The backrest and seat means 100 are attached at the upper corner brackets 40A, 40B, 40C and 40D and to the back rest posts 30A and 30B. The vertical back rest posts 30A and 30B are secured to the rear lower corner brackets 60A and 60B and slide freely through the upper rear corner brackets 40A and 40B as the assistive mobility device is opened and closed.

Figure 4:
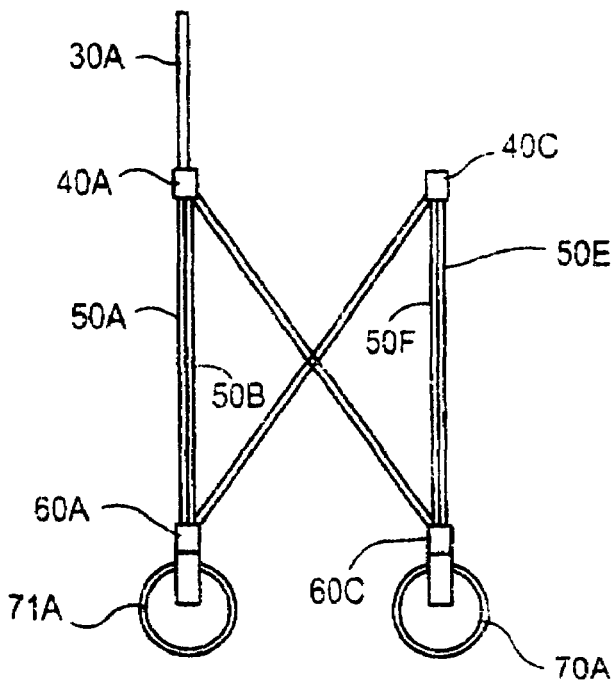
FIG. 4 is a side view of the basic assistive mobility device frame in a partially closed position without a push bar 20 and seat and back means 100.

In a preferred embodiment of the invention of FIGS. 1 and 2, the length of the seat support arms 50A, 50B, 50C, 50D, 50E, 50F, 50G, and 50H between the upper seat support arm brackets 40A, 40B, 40C, and 40D and the opposing lower seat arm support brackets 60A, 60B, 60C, and 60D is the same. In a preferred embodiment of the invention the seat support arms 50A and 50B, 50C and 50D, 50E and 50F, and 50G and 50H bisect each other forming a symmetrical frame. Seat support arms 50A and 50B, 50C and 50D, 50E and 50F, and 50G and 50H on each side of the fame are joined at the point of intersection with a swivel fitting or pin 55A, 55B, 55C and 55D which permits the seat support arms 50A and 50B, 50C and 50D, 50E and 50F, and 50G and 50H to move from an essentially parallel position when the assistive mobility device is closed, to a crossed position when in the open or sitting position. In addition, one end of each seat support arm is connected to an upper corner bracket 40A, 40B, 40C, and 40D by a swivel fitting and the opposite end of each arm is connected to a lower corner bracket by a swivel fitting. FIG. 4 illustrates a side view of the assistive mobility device frame in a partially closed position without push bar 20 and seat and back means 100.

Figure 5:
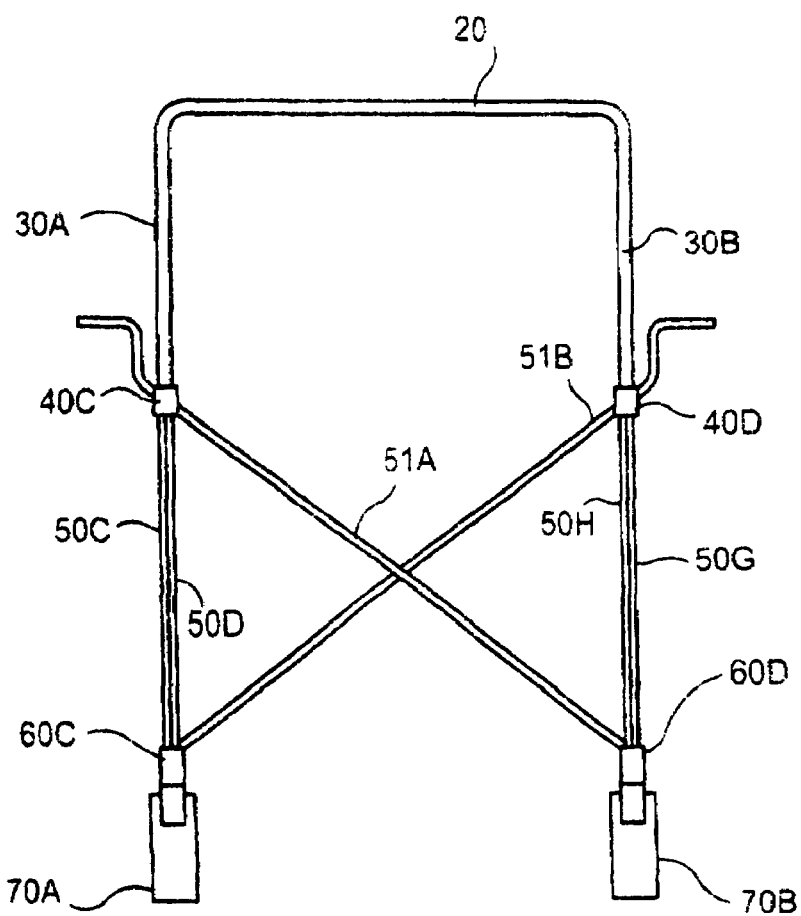
FIG. 5 is a front view of the assistive mobility device frame with casters and extended front seat support arm use to create an armrest frame shown without a seat and back means.

In another embodiment of the invention, the front two seat support arms 50E and 50F that extend across the front of the frame from the lower front corner brackets 60C and 60D to the upper front brackets 40C and 40D are replaced by two seat support arms 51A and 51B which extend above the upper front corner brackets 40C and 40D. The extensions 51A and 51B seat support arms 50C and 50D are bent above the upper corner brackets 40C and 40D to form the support frame for the armrests, as illustrated in FIG. 5. The armrest is created by a flexible fabric material which is attached or mounted on the seat support arm 51A and 51B and extends toward the back of the chair to form an essentially horizontal armrest for the assistive mobility device occupant.

In a preferred embodiment of the invention, the assistive mobility device has a removable push bar 20 that mounts on the two backrest support arms 30A and 30B. The push bar 20 has a fixed width that provides additional frame stability versus individual handles mounted on each backrest support arm (not shown) when the assistive mobility device is in its seating configuration.

Figure 3A:
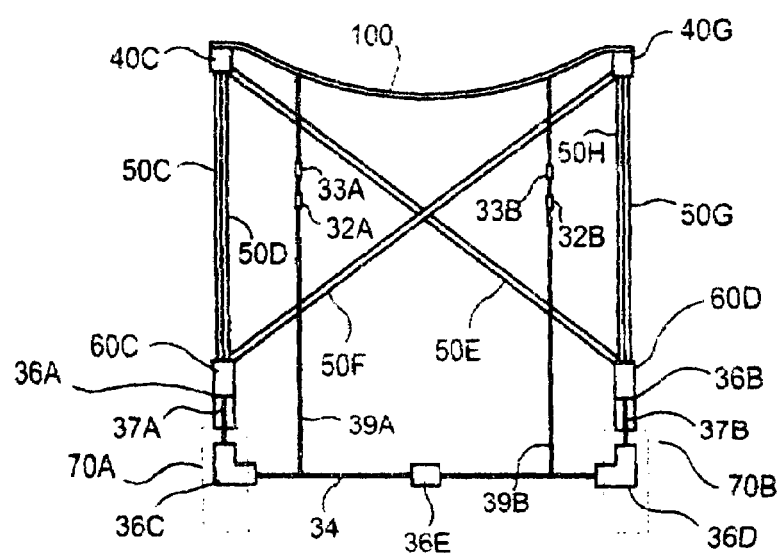
FIG. 3A is a cross section A→A in FIG. 3.

In a preferred embodiment of the invention, as shown in FIGS. 3 and 3A, the assistive mobility device also has an adjustable footrest 38 comprised of two telescoping hinged foot rest support arms 37A and 37B extending away from the front lower corner brackets 60C and 60D. The hinges are 36A and 36B. The outward ends of the leg rest support arms 37A and 37B are attached through hinges 36C and 36D to a footrest support cross member 34. In another embodiment of the invention, the footrest support cross member 34 is also hinged in the middle as at 36E thus allowing the two footrest support arms 37A and 37B and the foot rest support cross member 34 to become essentially parallel when the assistive mobility device is closed.

The footrest is held at the desired height off the ground by a pair of support straps 39A and 39B which are attached to the seat and back rest means 100 and to the foot rest cross member 34. Said support straps 39A and 39B have a means 32A and 32B for shortening or lengthening and a means for disconnecting 33A and 33B and connecting. Such means may be of any suitable type, including buckles or Velcro straps. By adjusting the length of the telescoping leg rest support arms 37A and 37B and the length of the support straps 39A and 39B, the assistive mobility device can be configured to comfortably fit different size occupants. The ability to disconnect the support straps 39A and 39B permits easy chair access.

Figure 6A:
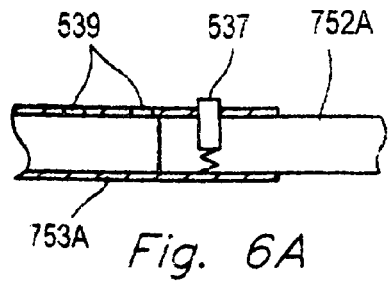
FIG. 6A illustrates telescoping assembly for backrest adjustment.
Figure 6B:
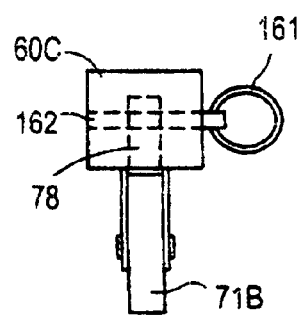
FIG. 6B illustrates a caster shaft mounting with a removable pin.
Figure 6:
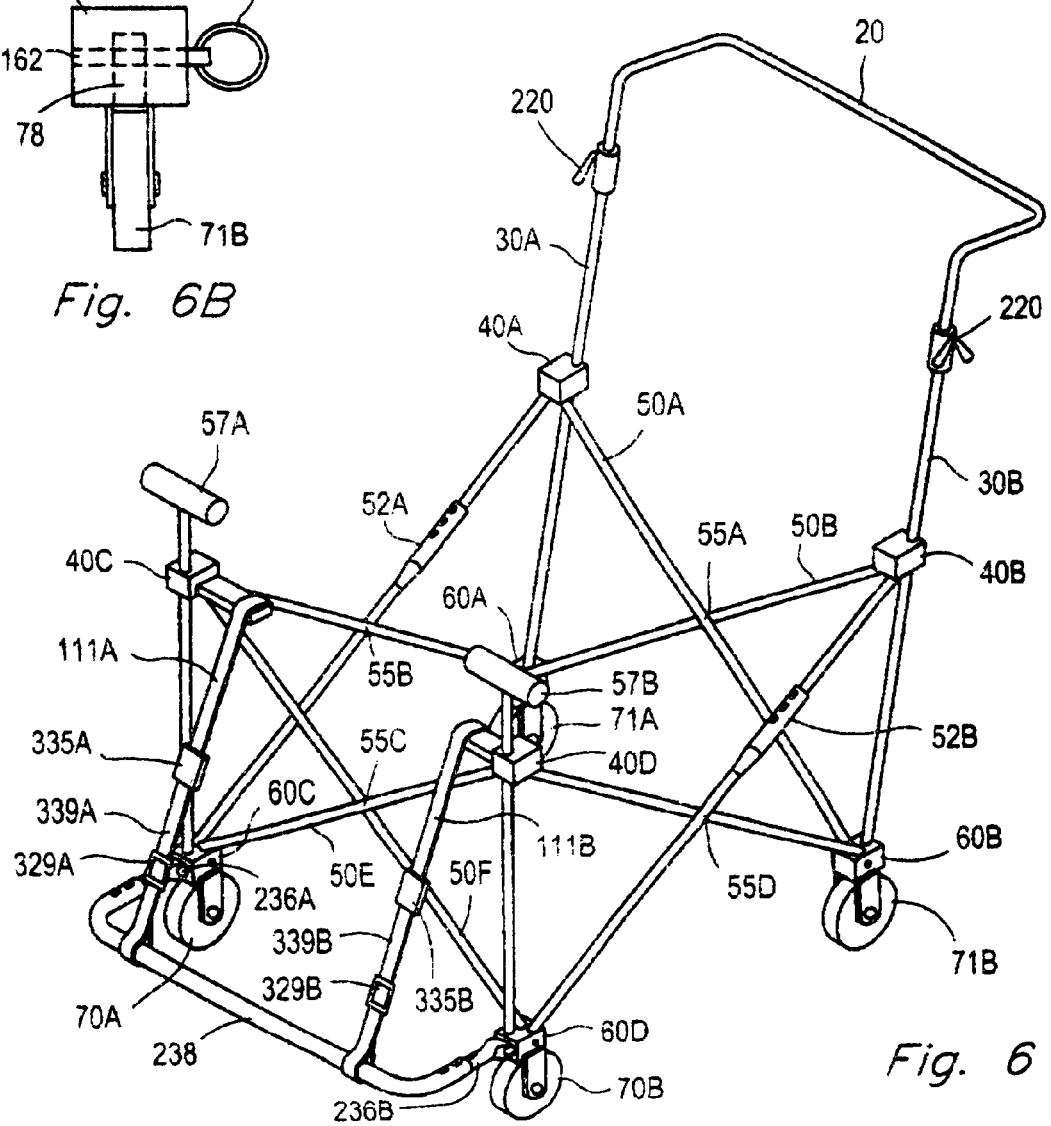
FIG. 6 is a perspective view of the assistive mobility device frame with casters and an adjustable back shown in a slightly reclined position shown without a seat and back means 100.

In yet another embodiment of the assistive mobility device as shown in FIG. 6, the seat support arms 50D and 50G which extend from the lower front left and right lower corner brackets 60C and 60D to their respective upper left and right corner brackets 40A and 40B as shown in FIG. 1, are replaced with locking telescoping seat support arm brackets 52A and 52B. Thus by extending or shorting the length of the telescoping seat support arms 52A and 52B, one can change the back rest angle for the occupant. FIG. 6A illustrates the telescoping portion of 52A. The assembly consists of an outer tube 753A that incorporates a number of holes 539 into which a push button locking and release clip 537 can be inserted to adjust the length of seat support arm 52A. A second smaller tube 752A slides inside the outer tube 753A. A push button lock and release clip 539 is mounted inside the second smaller tube 752A. Thus, by depressing the push button lock and release clip and sliding the tubes together or apart to a point where the push button lock and release clip 537 can be engaged in a hole 539 in the outer tube 753, the length of seat support arm 52A is adjusted which in turn changes the angle of recline of backrest post 30A. The seat means 100 is also adjustable to accommodate different backrest positions.

In all preferred embodiments of the invention the frame is made using a lightweight material such as aluminum, a high-strength composite, or an engineering grade of plastic. The footrest support straps 39A and 39B are made of a nylon web belting having a quick-release buckle and the combination seat and back means 100 are made of a strong flexible material such as a durable, high-strength, nylon canvas fabric.

In a preferred embodiment of the invention, the assistive mobility device also includes a flexible carrying case. The case may include pockets for the wheels and a shoulder strap.

Figure 7:
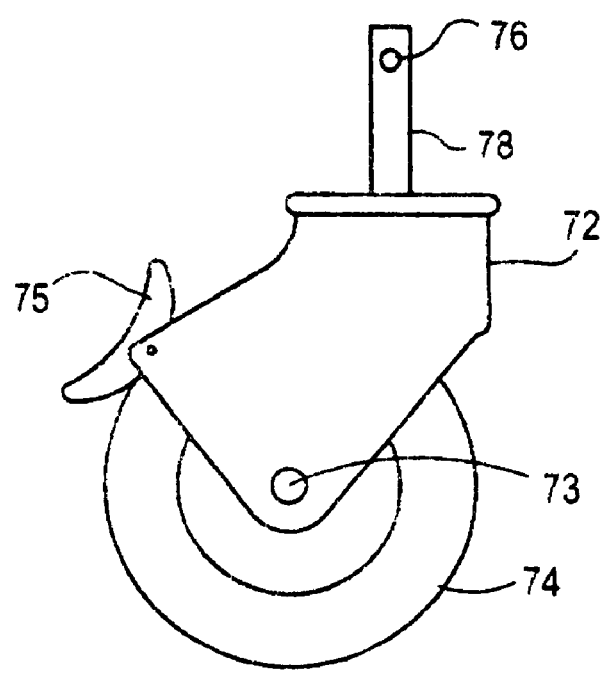
FIG. 7 is a side view of a caster body with brake lever.
Figure 9:
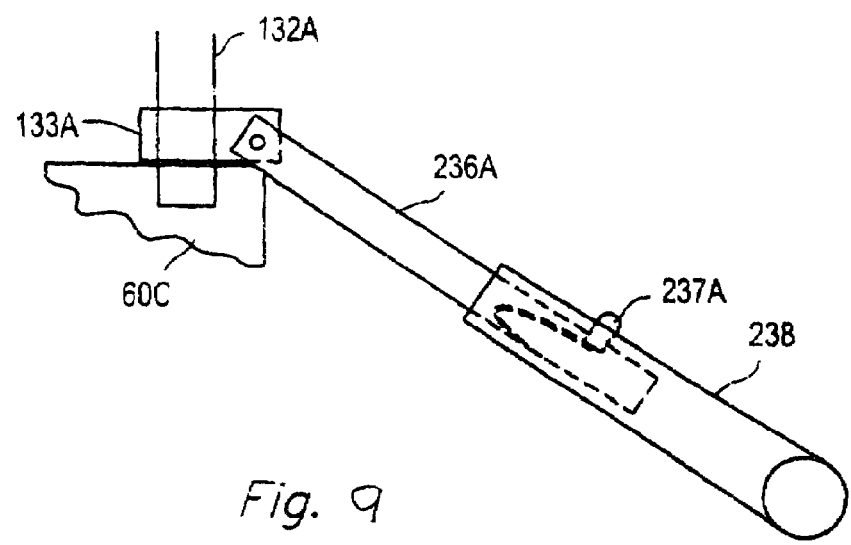
FIG. 9 is a side view of a telescoping detachable footrest.

In the preferred embodiment of the invention swivel caster wheels like those illustrated in FIG. 7 [formally FIG. 9 in CIP-1] are used for the front wheels. Each caster tracks with its axle 73 following its stem 78 and is free to rotate 360 degrees. The diameter of the caster wheel 74 (FIG. 7) is important. The casters wheels must be large enough to easily traverse many types of surfaces such as carpet, pavement, tile, concrete etc., yet excess diameter must be limited to permit a compact folding and easy transport of the chair. We have found that said caster wheel diameters in the range of about 3" to 10" are acceptable with the preferred embodiment being in the 5" to 6" diameter range.

Figure 8:
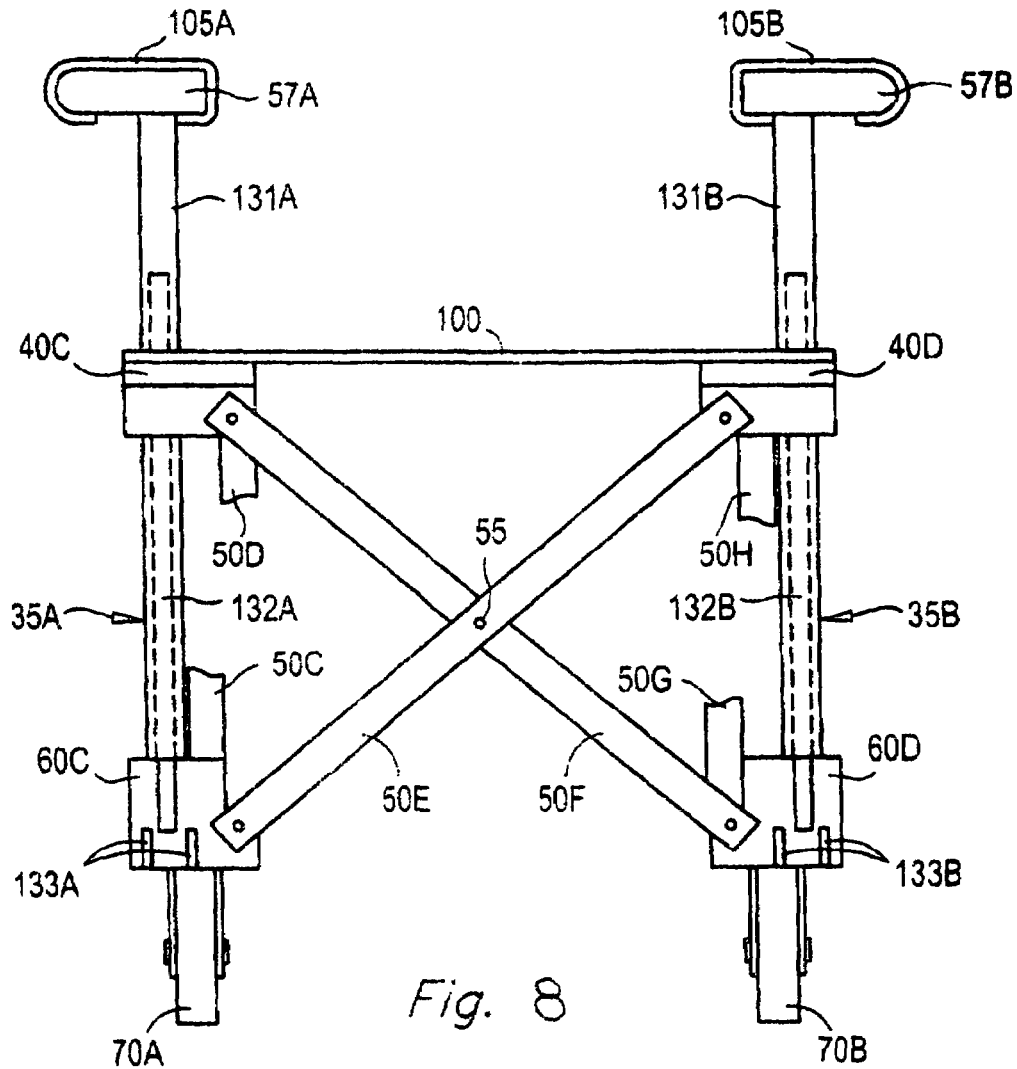
FIG. 8 is a cross section view of the front illustrating the anti-torque posts.
Figure 10:
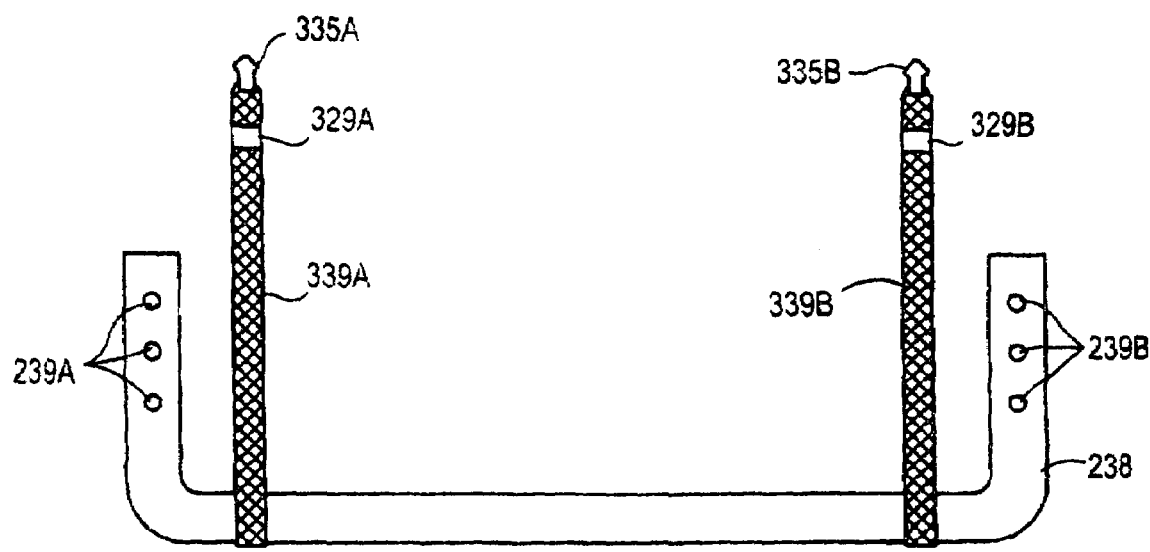
FIG. 10 is a front view of a detachable footrest with support straps.

In known fixed attachment systems, casters can be mounted in vertical posts such as the vertical telescoping lower sections, 132A and 132B of the two front telescoping vertically aligned anti-torque posts, 35A and 35B anti-torque (FIG. 8 [formally FIG. 10 in CIP-1]). Alternatively, casters can be mounted to the lower corner brackets 60C, and 60D, (FIG. 1). In one version of the invention, casters are mounted with a means of quick connect and disconnect attachment system as illustrated in FIG. 6B, permitting the caster to be removed and thus reducing the overall size of the chair when collapsed.

Figure 12:
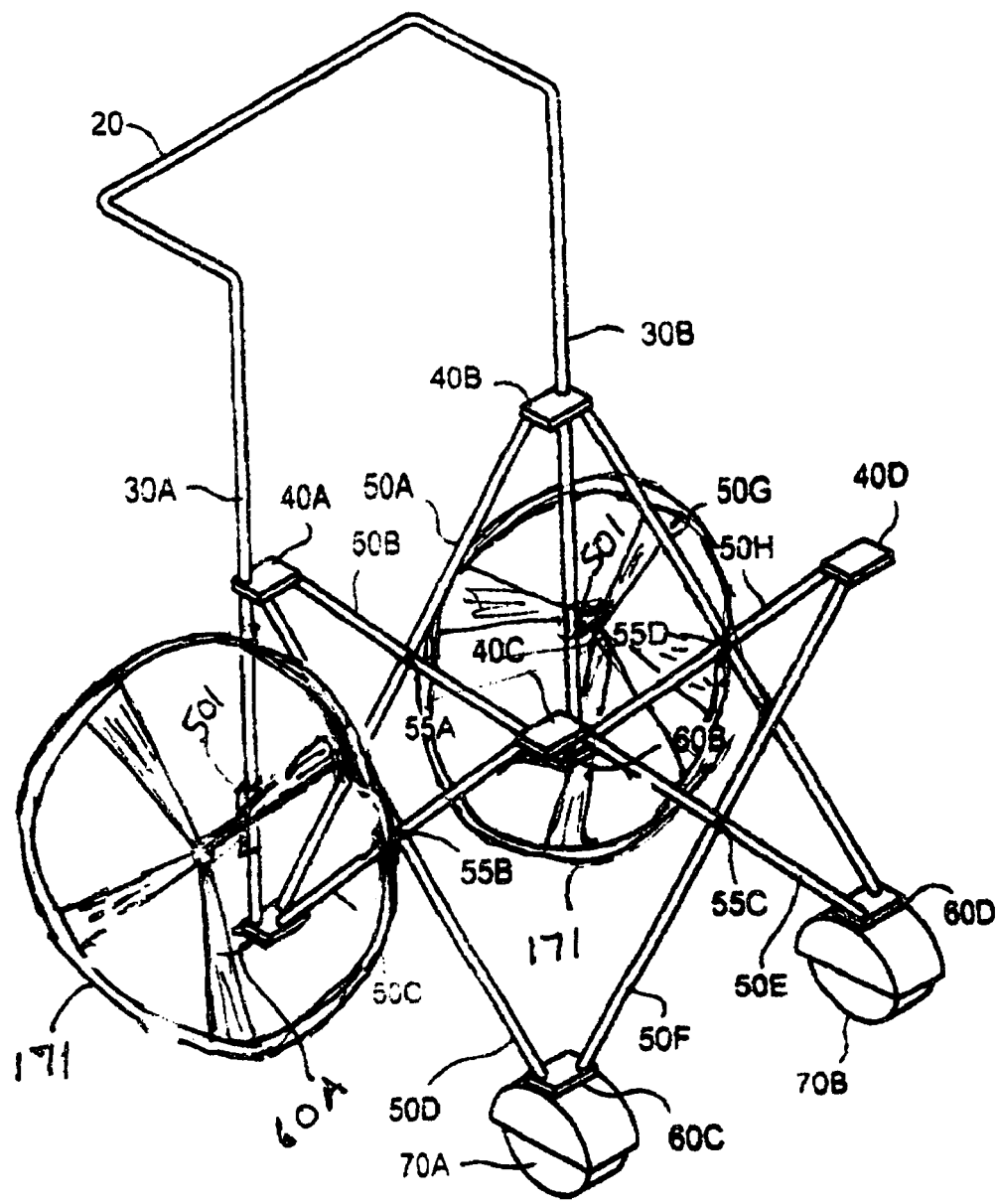
FIG. 12 is a perspective view of the chair with large wheels attached to rear posts
Figure 13:
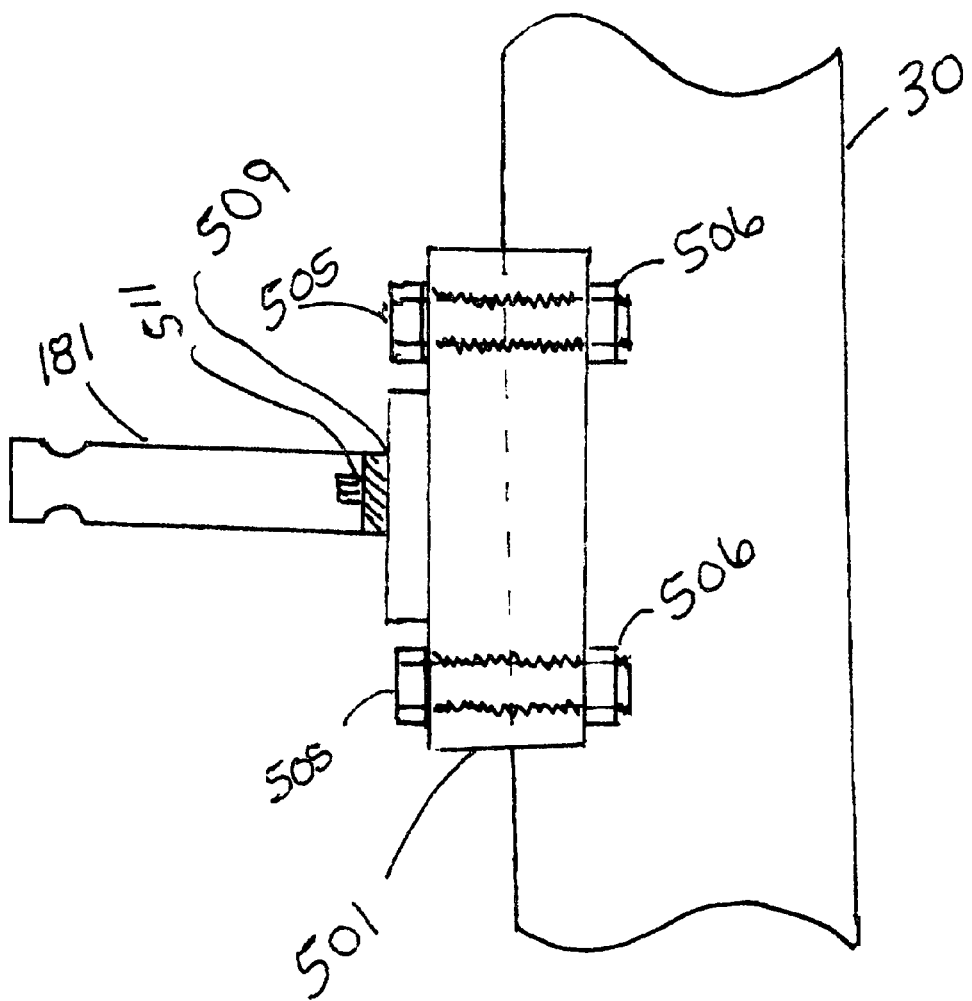
FIG. 13 is a side view of an axle and axle attachment mechanism viewed from the front or back of the chair.

In the preferred embodiment of this invention, large drive wheels 171 (FIG. 12) are mounted on axles 181 attached to the rear posts 30A and 30B as illustrated in FIG. 12. As with a standard wheelchair, the occupant can use the wheel 171 or a ring attached to the wheel (not illustrated) as a means to move the chair. FIG. 13 illustrates one type of mechanical means, a pair of nuts 506 and bolts 501, used to attach axle mounting hardware 501 to the rear posts 30A and 30B (FIG. 12). Axle mounting hardware may be mounted permanently at a fixed height above the floor to accommodate a single diameter drive wheel or may have an adjustable mounting to accommodate various diameter drive wheels.

Figure 14:
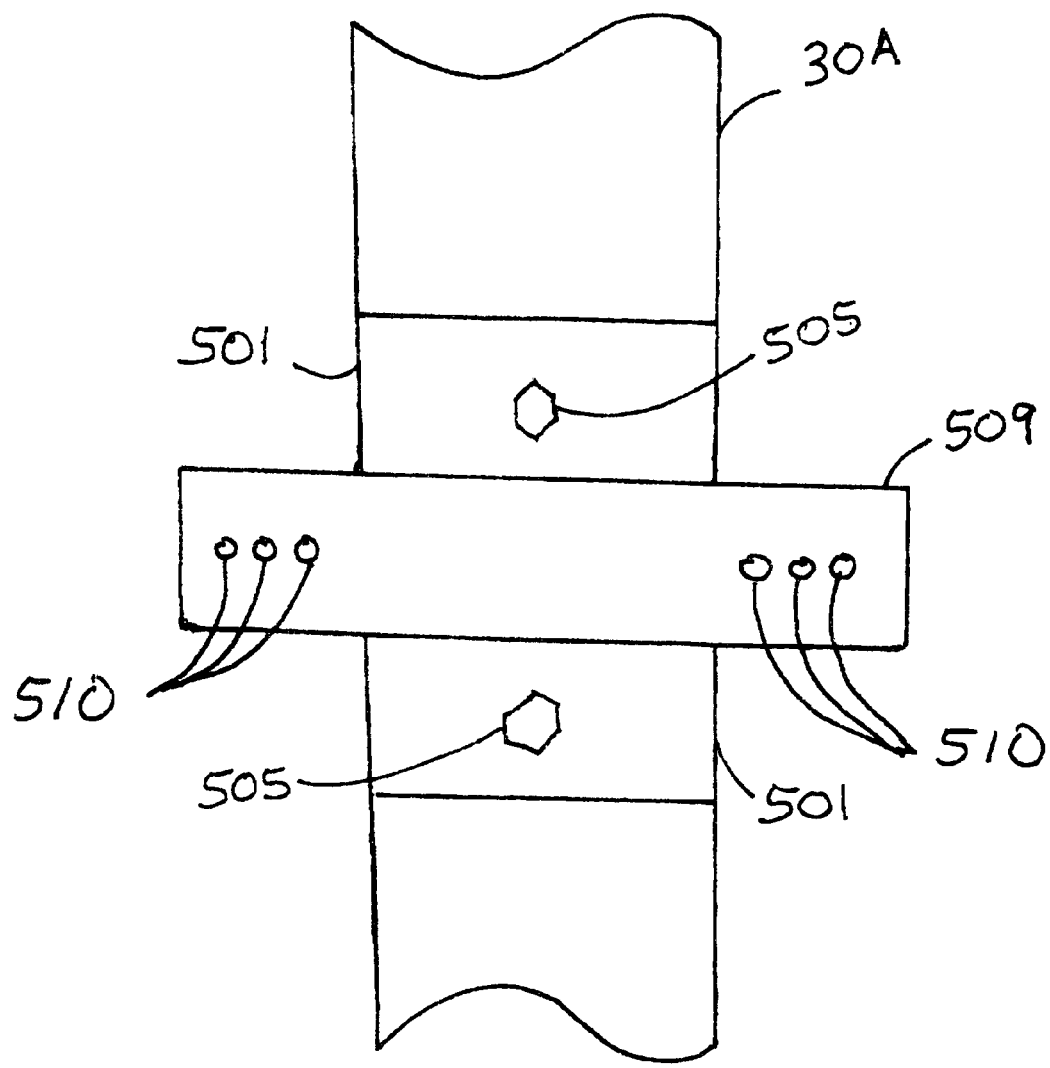
FIG. 14 is a front view of an axle attachment mechanism illustrating the holes in the axle mounting plate used to move the axle forward or backward with respect to the rear post.

In the preferred embodiment of the invention it is also our desire to provide a method for adjusting the axles toward the front or the rear of the chair which will adjust the location of the center of gravity. We illustrate one of many possible manual mechanical means for accomplishing this in illustration in FIG. 14. This is a front view of the axle mounting hardware 501 illustrated in FIG. 13 without the axle 181 attached. In this view of the axle mounting hardware 501, the axle mounting bar 500, can be seen with a number of horizontally located mounting holes 510 which provide horizontal adjustment for the axle 181 to be moved either forward or backward.

In the preferred embodiment of the invention it is also desirable to have the drive wheels removable in order to make the chair easier to carry and to reduce its overall size when collapsed. As an illustration of one mechanism for locking the wheel on during use and removal of the wheel after use we reference the description of the quick disconnect fitting described fully later under to discussion of FIG. 11A. The same principles illustrated in FIG. 11A for the installation and removal of the push bar 20 can be applied to installation and removal of wheels to and from axles.

In yet another embodiment of this invention (not illustrated), the drive wheels may be mounted on the front of the chair and rotational caster wheels may be mounted on the rear of the chair. This is possible because of the chair frame's unique symmetrical construction.

The preferred embodiment of this invention will also provide a breaking system to lock the chair in place while the occupant is entering and leaving the chair.

In yet another embodiment, telescoping anti-torque posts 35A and 35B (FIG. 8 [formally FIG. 10 CIP-1]) are added to the frame assembly to keep the front upper brackets, 40C and 40D, and the front lower brackets, 60C and 60D, in vertical alignment. Unlike "X" sided folding chairs whose support arms have relatively small angles above and below their point of intersection. The addition of casters to the mobility device significantly increases the angles above and below the support arms point of intersection because the distance between the upper corner brackets, 40A, 40B, 40C, and 40D, and lower corner brackets, 60A, 60B, 60C and 60D, is reduced.

Figure 8A:
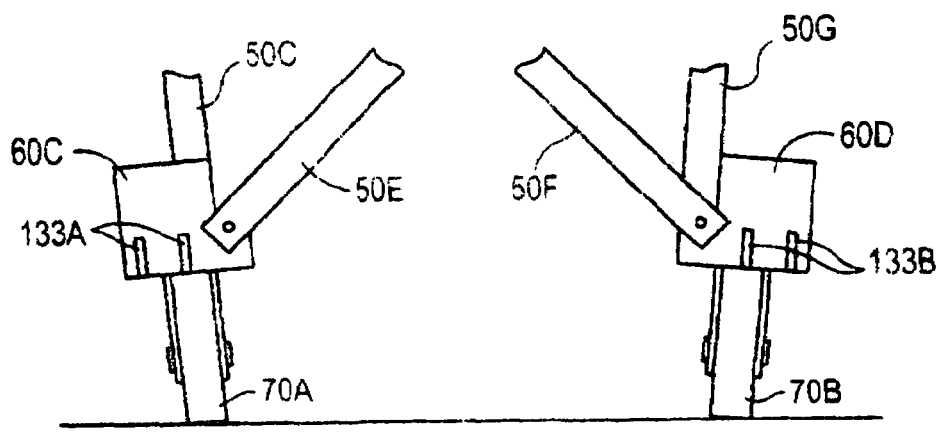
FIG. 8A illustrates front wheels under load without anti-torque posts.

Thus, as the top and bottom portions of the intersecting support arms are being spread wider to maintain the same seat height the top and bottom intersecting angles are increased. This increase in intersecting angles would not necessarily be a problem with a chair sitting on a flat surface where mass and friction will work to keep the lower corner brackets flat as they rest against the ground. It is, however, a significant problem when the chair is on casters so that the corner brackets are no longer in contact with the ground. The increased angle creates increased torque on the upper front brackets, 40C and 40D, and lower front brackets, 60C and 60D, causing them to rotate out of their normal vertical alignment and results in the casters support being forced outward whereby the caster wheels are at an angle to the ground, whereby they can not roll properly. As illustrated in FIG. 8A [formally FIG. 10A CIP-1] lower front corner brackets 60C and 60D that support caster 70A and 70B are forced from the vertical by the torque action described so that the wheels 70A and 70B are also forced to an angle relative to the ground thus rendering the mobility device inoperable. Additionally, the twisting tears the seat fabric 100.

The solution for this problem is the addition of anti-torque arms, as shown In FIG. 8, which is a front cross sectional view of the assistive mobility device. In this embodiment, two telescoping vertically aligned anti-torque posts, 35A and 35B, are comprised of lower posts, 132A and 132B attached to the two lower front corner brackets 60C and 60D. A second set of hollow slidable posts 131A and 131B are positioned over lower posts 132A and 132B. In one version of the invention the upper ends of 132 A and 132B are connected the upper front corner brackets 40C and 40D and in a preferred embodiment of the invention, the upper posts 131A and 131B extend through the upper front corner brackets 40C and 40D and are slidable within those brackets, as shown in FIG.8.

Thus, the upper portion of the anti-torque posts, 131A and 131B, are slidable through upper front corner brackets, 40C and 40D, and telescopically slide over the lower posts, 132A and 132B, during folding and unfolding of the assistive mobility device. In Fact, Posts 131A and 131B slide over smaller internal posts 132A and 132B thereby making it possible to fully collapse the chair.

The system shown in FIG. 8 solves the caster twisting technical problem by preventing such torque distortion. This is accomplished by adding vertical telescoping anti-torque posts assemblies 35A and 35B that keep the upper and lower front corner brackets 40C and 40D and 60C and 60D in vertical alignment. In turn, this is because the torque forces are less than the vertical force of anti-torque posts 35A and 35B. In essence, the anti-torque functionality of this invention is provided by front posts 35A and 35B.

As illustrated in FIG. 8, the lower end of posts, 131A and 131B, are supported by the lower front corner brackets 60C and 60D.

In one embodiment, hand grips 57A and 57B are attached to the upper ends of the telescoping anti-torque posts, 131A and 131B. These hand grips 57A and 57B provide a lifting point for the user getting in and out of the assistive mobility device.

In a preferred embodiment of the invention, the lower sections 132A and 132B (see FIG. 8) of the telescoping anti-torque posts 35A and 35B have the smaller diameter and slide inside the larger diameter sections 131A and 131B that are on top. It is known, however, that the reverse orientation could have been applied.

The length of the lower sections of the anti-torque posts, 132A and 132B, is such that these posts have a considerable overlap with the front upper sections of the anti-torque posts, 131A and 131B, when the device is in the collapsed position such that they will not be easily separated. Thus, a portion of the interior sections 132A and 132B are always contained within the upper outer sections 131A and 131B. For the first time in the art of rolling chairs this telescoping system makes it possible to maintain casters in alignment during use and still have a collapsible chair closing simultaneously in the X and Y direction.

Another improvement is the addition of flexible armrest supports 115A and 115B that are attached hand grips 57A and 57B and to the backrest supports 30A and 30B. The length of the upper anti-torque posts 131A and 131B is determined by the desired height of the hand grips 57A and 57B. By well known means one end of the armrests 115A and 115B are attached to hand grips 57A and 57B and the opposite end to the backrest posts 30A and 30B.

Figure 11:
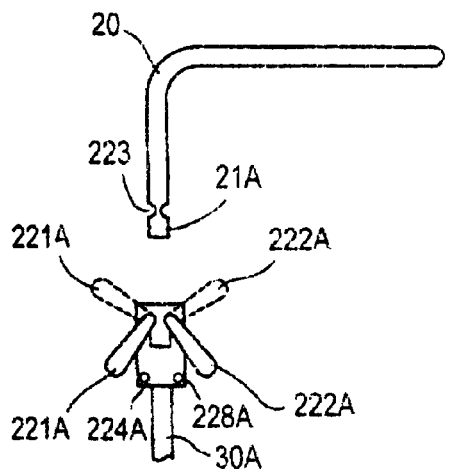
FIG. 11 is a perspective view of a mobility device with anti-torque arms, footrest, and arm rests.
Figure 11:
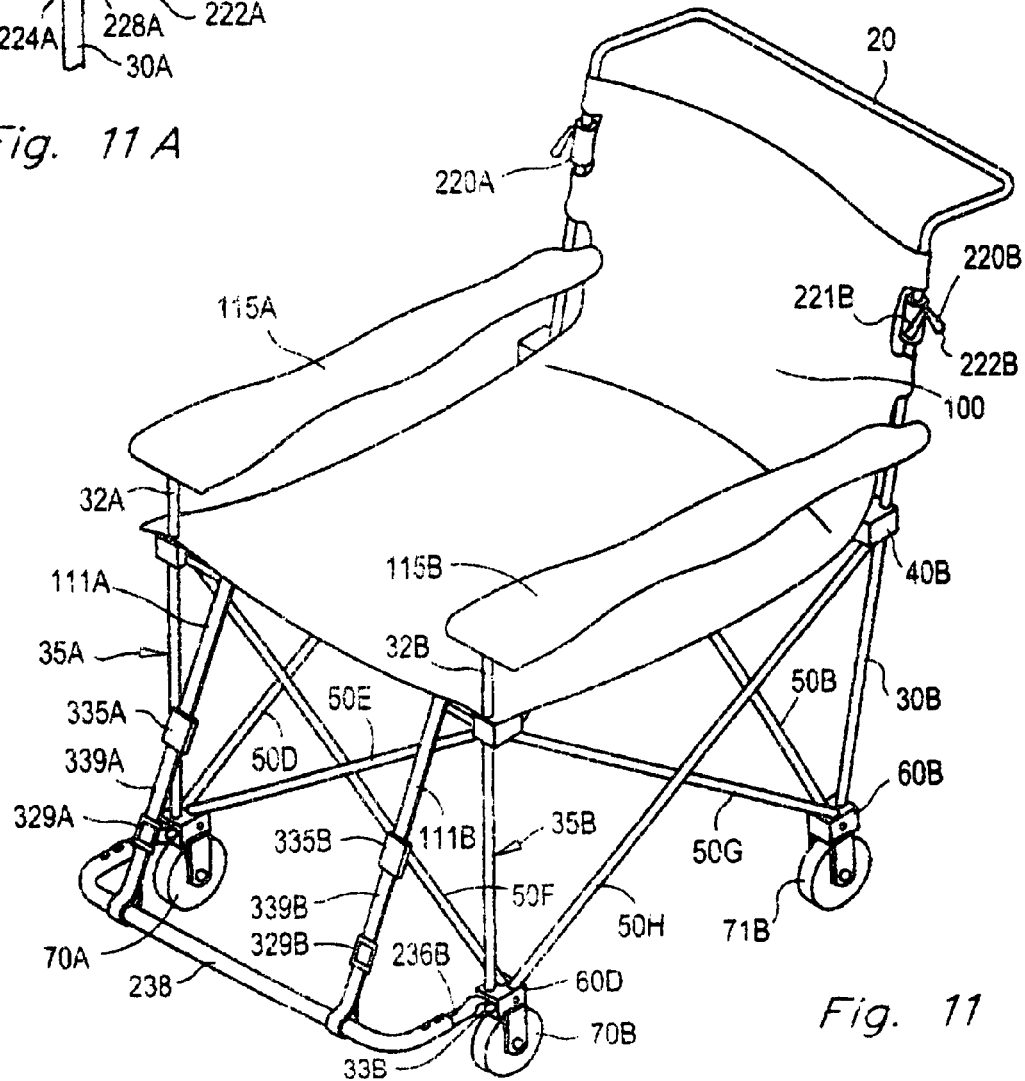

Referring now to FIGS. 9 and 10 [formally FIGS. 11 and 12 CIP-1] we describe yet another improvement, of the invention. The armrest height can be made adjustable by incorporating a locking mechanism into the telescoping lower sections, 132A and 132B of the anti-torque posts and/or the upper anti-torque posts, 131A and 131B, such that said hand grips can be locked in one or more positions above what would have been their normal position without such a mechanism.

Previously we described a footrest, 38 (FIGS. 3 and 3A) which was collapsible, telescoping and hinged in five locations 36A, 36B, 36C, 36D, and 36F. Although the footrest described is removable, it was anticipated that it would remain attached to the mobility device when opened and collapsed by folding. The operation would occur through a series of hinges and swivel fittings such that the various components of the footrest, 37A and 37*b*, and 34 would all end up being aligned with the support arms in the closed position and in a usable configuration when the chair was in open position. The closing movements included two sections of cross bar 34 moving to a parallel position during closing at hinge 36E as the support arms are pushed together. Simultaneously, hinges 36C and 36D would also start to rotate their sides connected to 34 coming together. In addition, attachment arms 37*a* and 37B and the side portion of the footrest 38 would drop from the near horizontal plane to a near vertical plane parallel to the to the support arms while the collapsing cross bar also moved to a near vertical plane. Thus creating a series of supports all about parallel to each other and to the frame cross support arms.

In addition, there are two alternate methods for providing a footrest that are user friendly while allowing the mobility device to fold in both the X and Y directions and yet not creating a tripping hazard. One method (not shown) is to attach a footrest mounting bracket to the front support Posts, 50E and 50F (FIG. 1), near or at their point of intersection. A detachable vertical footrest support arm is attached to the footrest mounting bracket and a near horizontal arm is swivelly attached to the lower end of the vertical arm. Thus, the vertical and near horizontal supports can collapse to a parallel position when closed either when either attached to the mobility device or detached. To increase the strength of the fitting, one or two straps may be used to connect the top of the horizontal arm with the unconnected end of the near horizontal arm.

A detachable footrest is mounted on the non-swivel end of the near horizontal footrest support arm. Possible mounting mechanisms include but are not limited to sliding on, pinning, or other means for quick attachment.

In another preferred embodiment of the footrest, two footrest mounting brackets 133A and 133B (see FIG. 8) are attached above the lower front corner brackets 60C and 60D. Two footrest swivel arms 236A and 236B (FIG. 9) are connected by a swivel means to the footrest mounting brackets 133A and 133B. The footrest swivel arms 236A and 236B comprise one side of a telescoping assembly having a push button locking mechanism 239A and 239B that retain the other side of the telescoping assembly, of the detachable footrest 238.

FIG. 10 illustrates the footrest 238 that telescopically slides onto the footrest swivel arms 236A and 236B and holes 237A and 237B that provide for adjustable length when the footrest is attached. FIG. 10 also shows, two adjustable length straps 339A and 339B that have the bottom half of quick connect buckles 335A and 335B attached to one of their ends and their other ends attached to the footrest 238 near its outside corners. The length of belts 339a and 339B is adjusted by slide locks 329A and 329b which provide for the shortening or lengthening of the belts. Two additional belts 111A and 111B (FIG. 11 [formally FIG. 13 in CIP-1]) have the upper half of quick connect buckles 335A and 335B attached to one of their ends and the other ends are attached to the front of the seat 100 (FIG. 11). Said upper and lower halves of seat buckles 335A and 335B connect to each other. This design provides for the footrest to be removed when the assistive device is folded, to be lowered to a near vertical position when the user is entering or exiting the assistive device thus avoiding tripping and falling hazards, and to be adjusted in length and height during use.

One means for providing structural rigidity is a seat 100 that also has a unified back. This is illustrated in FIGS. 3 and 11, as a method of interconnecting the upper corner brackets 40A, 40B, 40C and 40D. The seat and backrest 100 can also be separated as two individual units, however, in either case the key structural element of the seat is its attachment at the upper corner brackets 40A and, 40B, 40C and 40D. Securing the seat 100 at these four points provides a mechanical means for preventing the collapse of the chair frame structure beyond the intended size dictated by the seat 100. The seat 100 is constructed of a flexible material in order that the mobile chair can be collapsed and of a strong material with reinforced attachment points such that it can withstand the increased forces previous described.

Alternatively, a web or belt (not shown) could be used to interconnect the perimeter of upper corner brackets 40A and, 40B, 40C and 40D or the perimeter of lower corner brackets 60A, 60B, 60C and 60D for structural strength and a non structure bearing seat likewise attached.

The push bar 20 (FIG. 11) is attached by a quick connect means in order that it can be quickly connected and disconnected prior to the unfolding and folding operations. Because the push bar 20 can be used to both lift, tilt and push the mobility device it must be strongly connected to the backrest posts 30A and 30B. The quick connect fittings 220A and 220B are located near the upper end of the back rest support posts 30A and 30B and are positioned such that the push bar ends 21A and 21B slide vertically down into the quick connect fittings 220A and 220B. In the preferred embodiment of the invention the quick connect fitting is a cam lock connection.

FIG. 11A {formally FIG. 13A CIP-1} illustrates how the push bar 20 is installed into the quick connect fittings 220A and 220B that are attached to the top of backrest posts 30A and 30B by rivets 228A and (228B not shown). The two push bar ends 21A and 21B are inserted into the quick connect fixture bodies 224A and 224B. The cam lock arms 221A and 222A and 221B and 222B are attached to the quick connect fixture bodies by pins 225 that allow the arms to rotated from a near upward pointing direction to a near downward point direct. As the cam lock arms 221A and 222A and 221B and 222B are lowered, the gap between the quick connect fixture bodies 222A and 222B and the push bar ends 21A and 21B is closed by the cams located at the pinned ends of the cam lock arms 221A and 222A and 221B and 222B and frictional pressure is applied to the push bar ends 21A and 21B, thus locking them in place. To remove the push bar the process is reversed.

In a preferred embodiment, groves 223 or similar detents are incorporated into the push bar ends 21A and 21B at their point of intersection with the cam lock arms 221A and 222A and 221B and 222B to insure a non slip fitting.

Other locking mechanisms such as locking pins which slide through a locking fixtures and push bar ends 21A and 21B, (not shown) or a twist frictional grips (not shown) can be used to secure the push bar 20 to the backrest posts 30A and 30B. The push bar quick connect fittings 220A and 220B are located on posts 30A and 30B at a height approximately five inches below the total height of the device. Thus creating a push bar 20 with approximately a six inch vertical rise and approximately a six inch horizontal extension. This height was chosen to keep the folded height of the mobility device to a minimum while creating a push bar that would fit within the carrying case for the device without increasing the overall size of the carrying case or bag by more than the diameter of the push bar 20. Alternatively, locations for the quick connect fixtures 224A and 224B are possible and could include but are not limited to an elbow fixture at the top of the backrest posts (not shown) or horizontally mounted quick connect fixture (not shown).

It is also recognized a pair handles may be used instead of a single push bar. These handles may be of a collapsible or removable design. One collapsible version of said handles would be to construct them in a way that would allow them to be rotated 90 degrees when the mobility device was collapsed (not shown) and a second method of handle collapse would be allow them to fold down parallel to the rear posts when not in use. A removable method of handle construction would be to attach them with a quick connect fitting similar to those previously described. The handles would be thus removed during collapse and reinstalled for use in the open position.

Figure 15:
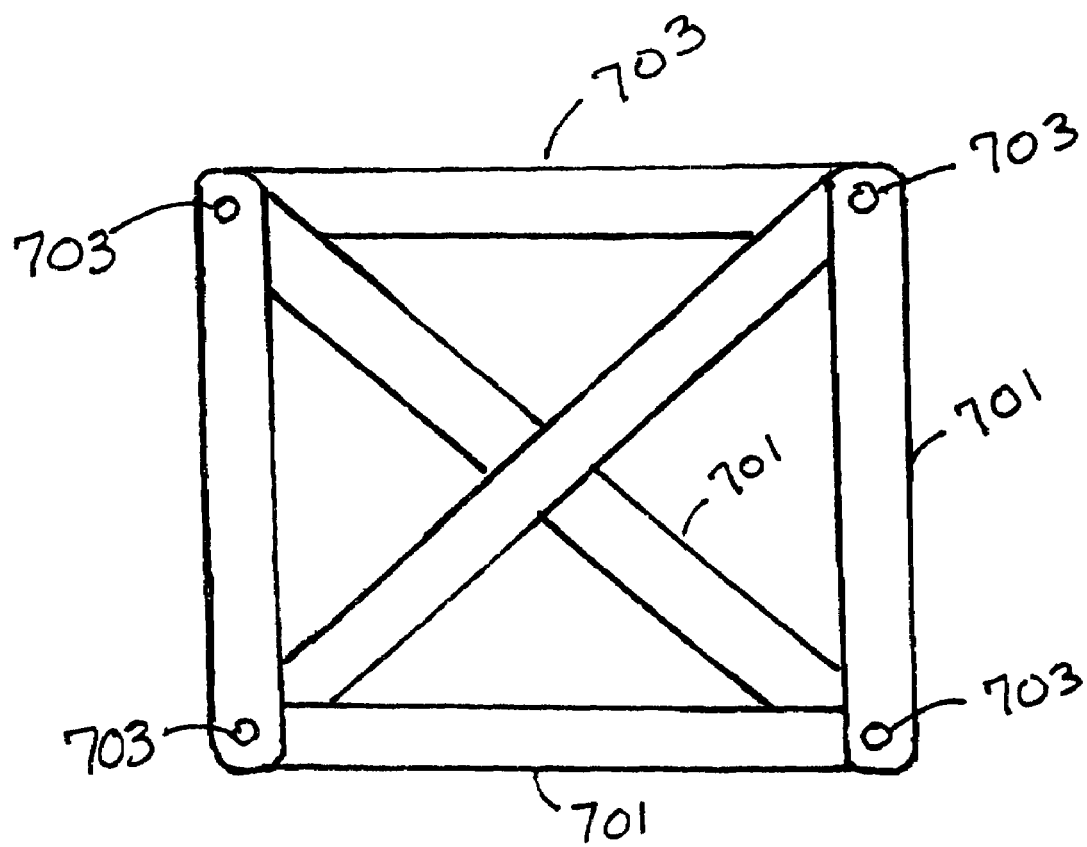
FIG. 15 is a view looking down on a Hefty Strap.

Another embodiment of the invention is what we have defined as the "Hefty Strap". The Hefty Strap is designed to provide additional structural strength in the area around the lower corner brackets when it is desired create a chair that will carry a very heavy person. The Hefty Strap is a set of one or more straps that are made of a flexible not stretchable material that interconnect one or more vertical posts or lower corner brackets. FIG. 15 represents a Hefty Strap 700 having a pattern of a perimeter straps 701 on each side in addition to a pair of cross straps 702 connecting opposite corners. The Hefty Strap in FIG. 15 has grommets 703 in each corner that could be used to slip over four vertical posts. Using FIG. 11 as an example, the four grommets would be slipped onto posts 35A, 35B, 30B and 30A (not shown). When the chair in FIG. 11 is in its unfolded state the Hefty Strap would rest on the lower corner brackets 60 and provide additional structural strength. When the care is folded, the Hefty Strap collapses and is stored away with the frame.

From the foregoing, it will be seen that the invention is well adapted to accomplish all of the ends and objectives herein and above set forth, together with other advantages which are obvious and inherent to the apparatus and structure. It will be understood that certain features and sub-combinations are of utility and may be employed without reference to other features and sub-combinations. This is contemplated by and is within the scope of the claims. Because many possible embodiments may be made of the invention without departing from the scope hereof, it is to be understood that all matters set forth and shown in accompanied drawings are to be interpreted as illustrative only and not to in a limiting sense.

The invention claimed is:

1. A four-sided collapsible chair frame assembly on wheels comprising:
   i. Four frame sides each comprising two pivotally connected intersecting support members per side;
   ii. said frame assembly including four upper brackets and four lower brackets:
   iii. one end of each support member is connected to a lower bracket and the other end of each support member is connected to an upper bracket, wherein the lower end of each support member is connected to a lower bracket that also connects the lower end of an adjacent support member and the upper end of each support member is connected to an upper bracket that also connects the upper end of the adjacent support member,
   iv. said collapsible chair frame having a designated front side comprising two lower brackets and two upper corner brackets and opposite the front side a designated back side comprising two lower brackets and two upper corner brackets,
   v. a vertical post mounted on each backside lower bracket and extending vertically from the lower bracket to or through a vertically aligned upper bracket,
   vi. two telescoping anti-torque posts each extending vertically from the front lower brackets to or through an upper front bracket,
   vii. a wheel at each corner attached to at least one of: a lower bracket, a structure attached to a lower bracket, a post in vertical alignment with the lower bracket, an attachment to a post in vertical alignment with the lower bracket, whereby a collapsible four-sided wheeled chair frame is formed.

2. The invention of claim 1 wherein a means for braking and locking the wheeled chair frame into a stationary position is provided.

3. The invention of claim 1 including means for a backrest support.

4. The invention of claim 1 wherein the frame includes at least one of: a seat means, a seat and a backrest means, a combined seat and backrest means, each attached to the frame for supporting a person.

5. The invention of claim 1 wherein the frame includes a footrest means attached to the frame to support a persons feet.

6. The invention of claim 1 wherein the frame includes an armrest means attached to the frame to support a persons arms while seated.

7. The invention of claim 1 wherein the frame includes a means connected to said backrest support posts for moving the chair, including lifting the rear wheels off the ground or tilting the front wheels off the ground in order to change elevation or avoid obstructions to movement, said means including at least one of: a single handle, a pair of handles, being rapidly removable, being collapsible, being a permanent part of the chair.

8. The invention of claim 1 wherein a drive wheel is attached to at least one of: a lower bracket, a structure attached to a lower bracket, a post in vertical alignment with a lower and upper bracket, an attachment to a post in vertical alignment with a lower and upper bracket.

9. The invention of claim 1 where in a Hefty Strap means is provided for increased structural strength.

10. A mobility collapsible chair suitable for movement over a surface comprising:
   A. a four-sided frame, collapsible from front to back and side to side, said frame having front, back and sides; said frame including:
      a. a front side comprising front crossed support arms;
      b. a back side comprising back side crossed support arms;
      c. a left side comprising left side crossed arms,
      d. a right side comprising right side crossed arms
      e. each of said crossed support arms pivotally connected where they cross and being of equal length;
      f. wherein each of said arms has a lower end and an upper end; and
      g. wherein the lower end of one of the front support arms and the lower end of the adjacent left side support arm are connected to a left lower front bracket, adjacent thereto; and
      h. the lower end of one of the other front support arms and the lower end of the adjacent right side support arm are connected to a right lower front bracket adjacent thereto; and
      i. wherein the lower left end of one back support arm and the adjacent lower back left end of the left side support are connected to a lower left back bracket adjacent such respective ends, and
      j. wherein the lower right end of another back support arm and the adjacent lower right back end of the right side support arm are connected to a right lower back bracket adjacent such respective ends, and
      k. wherein the upper left end of the back support arm and the upper left back end of the side support arm are connected to an upper left back bracket adjacent such respective ends; and
      l. wherein the upper right ends of the back support arm and the upper right back end of the side support arm are connected to an upper right back bracket adjacent such respective ends; and
      m. wherein the upper left end of the front support arm and the upper left front end of the adjacent left side support arm are connected to an upper left front bracket adjacent such respective ends,
      n. wherein the upper right end of the front support arm and the upper right front end of the adjacent right side support arm are connected to an upper right front bracket adjacent such respective ends,
   B. Said chair further comprising a pair of rear backrest support posts, each having an upper end and a bottom end, the bottom of each post being connected to a lower rear bracket in vertical alignment with said post; each of said posts slidably passing through an upper bracket in vertical alignment with said post; said posts having the strength required to permit lifting the front or back of the chair off the ground in order to change elevation or avoid obstructions to movement,
   C. right and left telescoping anti-torque posts, each having an upper section and a lower section, with one section slidably telescoping within the other; and wherein the right post is supported by said right front bracket and the left post is supported by said left front bracket; said posts being maintained in vertical alignment by said brackets, and each of said posts slidably passing through an upper bracket in vertical alignment with said post;
D. wheels attached to at least one of: the front lower brackets, an attachment to the front lower bracket, the front anti-torque posts, an attachment to the front anti-torque posts, the back lower brackets, an attachment to the back lower brackets, the rear backrest support posts, an attachment to the rear backrest support posts,
E. means connected to at least one of: said front post, rear posts, upper corner brackets for holding the frame in its open position.

11. A mobility collapsible chair as claimed in claim 10, including at least one of: a separate seat, a separate seat and separate back, a combined seat and back.

12. A mobility collapsible chair as claimed in claim 10 wherein at least a pair of: rear wheels, front wheels are drive wheels that will permit the occupant to generate motion.

13. A mobility collapsible chair as claimed in 10 including a footrest.

14. A mobility collapsible chair as claimed in claim 13 wherein said footrest is adjustable in both the horizontal and the vertical planes.

15. A footrest as claimed in claim 13 wherein the footrest comprises a forward telescoping frame member and is at least one of: collapsible, detachable.

16. A mobility collapsible chair as claimed in claim 10 wherein hand grips are placed on the upper ends of telescoping anti-torque posts to assist the chair occupant to stand or sit.

17. A mobility collapsible chair as claimed in claim 16 wherein flexible arm rests are attached to the hand grips on the upper end of the anti-torque posts and to the backrest posts.

18. The mobility chair as recited in claim 10, wherein the position of the backrest is adjustable.

19. The invention in claim 10 wherein the means for moving the chair is a push bar connected by means of a quick release fitting to the upper ends of the backrest support posts, said fittings, posts, and push bar having the strength and rigidity required to permit lifting the rear wheels off the ground or tilting the front wheels off the ground in order to change elevation or avoid obstructions to movement.

20. A collapsible chair frame assembly on wheels comprising:
i. At least four frame sides each comprising two pivotally connected intersecting support members per side:
ii. said frame assembly including a number of upper brackets and a number of lower brackets equal to the number of sides:
iii. one end of each support member is connected to a lower bracket and the other end of each support member is connected to an upper bracket, wherein the lower end of each support member is connected to a lower bracket that also connects the lower end of the adjacent support member and the upper end of each support member is connected to an upper bracket that also connects the upper end of the adjacent support member,
iv. said collapsible chair frame having a designated front side comprising two lower brackets and two upper brackets and opposite side designated back side comprising two lower brackets and two upper corner brackets
v. a vertical post mounted on each back side lower bracket and extending vertically from the lower bracket to or through a vertically aligned upper bracket,
vi. a telescoping anti-torque posts mounted on each front lower bracket having a caster wheel said telescoping anti-torque posts extending vertically from the lower brackets to or through a vertically aligned upper bracket
vii. a wheel attached at each corner attached to at lease one of: a lower bracket, a structure attached to a lower bracket, a post in vertical alignment with a lower and upper bracket, a structure attached to a post in vertical alignment with a lower and upper bracket,
viii. a Hefty Strap means attached to at least one of: two lower brackets, two vertical posts for providing additional structural strength, whereby a collapsible wheeled chair frame assembly is formed.

* * * * *